United States Patent
Nakano

(10) Patent No.: US 11,861,812 B2
(45) Date of Patent: Jan. 2, 2024

(54) CAMERA PARAMETER ESTIMATION APPARATUS, CAMERA PARAMETER ESTIMATION METHOD, AND COMPUTER-READABLE RECORDING MEDIUM

(71) Applicant: NEC Corporation, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 17/420,946

(22) PCT Filed: Jan. 9, 2019

(86) PCT No.: PCT/JP2019/000288
§ 371 (c)(1),
(2) Date: Jul. 6, 2021

(87) PCT Pub. No.: WO2020/144757
PCT Pub. Date: Jul. 16, 2020

(65) Prior Publication Data
US 2022/0076388 A1   Mar. 10, 2022

(51) Int. Cl.
*G06T 5/00* (2006.01)
*H04N 23/62* (2023.01)

(52) U.S. Cl.
CPC .............. *G06T 5/006* (2013.01); *H04N 23/62* (2023.01)

(58) Field of Classification Search
CPC ........... G06T 5/006; G06T 7/80; H04N 23/62; H04N 23/81; H04N 25/61
See application file for complete search history.

(56) References Cited

U.S. PATENT DOCUMENTS

| | | | |
|---|---|---|---|
| 2019/0102911 A1* | 4/2019 | Natroshvili | B60R 1/00 |
| 2019/0387212 A1* | 12/2019 | Oh | G06T 3/0031 |
| 2020/0051279 A1* | 2/2020 | Nakano | G06T 7/80 |
| 2020/0304737 A1 | 9/2020 | Sakano | |

(Continued)

FOREIGN PATENT DOCUMENTS

| | | |
|---|---|---|
| JP | 2006086822 A | 3/2006 |
| JP | 2017139600 | 8/2017 |
| JP | 2017163386 A | 9/2017 |

OTHER PUBLICATIONS

English translation of Written opinion for PCT Application No. PCT/JP2019/000288, dated Apr. 9, 2019.

(Continued)

*Primary Examiner* — Kelly L Jerabek

(57) ABSTRACT

A camera parameter estimation apparatus 10 for estimating geometric parameters of a camera that has shot an image of an object and a lens distortion parameter of a lens distortion model represented by a single unknown. The camera parameter estimation apparatus 10 includes: a data obtaining unit 11 that obtains image corresponding points relating to the object and an approximation order for polynomial approximation of the lens distortion model; and a parameter estimation unit 12 that estimates, based on the image corresponding points and the approximation order, the geometric parameter and the lens distortion parameter that minimize an error function representing a specific transformation of the image corresponding points.

6 Claims, 4 Drawing Sheets

(56) References Cited

U.S. PATENT DOCUMENTS

2020/0410650 A1* 12/2020 Yamazaki .............. H04N 23/81

OTHER PUBLICATIONS

International Search Report for PCT Application No. PCT/JP2019/000288, dated Apr. 9, 2019.
Sagawa et al., "Calibration of lens distortion by structured-light scanning", Intelligent Robots and Systems, 2005, IEEE/RSJ International Conference, Sep. 2005, pp. 832-837.
Bukhari et al.,"Automatic radial distortion estimation from a single image", Journal of Mathematical Imaging and Vision, vol. 45. No.1, pp. 31-45, 2013, Springer.
Fitzgibbon, "Simultaneous linear estimation of multiple view geometry and lens distortion", IEEE Computer Society Conference on Computer Vision and Pattern Recognition. IEEE Computer Society Conference on Computer Vision and Pattern Recognition, Feb. 2001, pp. 1-8.
Kukelova et al., "Real-time solution to the absolute pose problem with unknown radial distortion and focal length", IEEE International Conference on Computer Vision (ICCV). Dec. 2013, pp. 1-7.
Nakano, "A versatile approach for solving PnP. PnPf, and PnPfr problems", IEEE European Conference on Computer Vision (ECCV), Oct. 2016, pp. 1-15.
Devernay et al., "Straight lines have to be straight", Machine Vision and Applications, vol. 13, No. 1, pp. 14-24, Aug. 2001, Springer.

* cited by examiner

CAMERA PARAMETER ESTIMATION APPARATUS, CAMERA PARAMETER ESTIMATION METHOD, AND COMPUTER-READABLE RECORDING MEDIUM

This application is a National Stage Entry of PCT/JP2019/000288 filed on Jan. 9, 2019, the contents of all of which are incorporated herein by reference, in their entirety.

TECHNICAL FIELD

The present invention relates to a camera parameter estimation apparatus and a camera parameter estimation method for calculating a geometrical parameter of a camera and a lens distortion parameter, and further relates to a computer-readable recording medium on which a program for realizing these is recorded.

BACKGROUND ART

Images shot by a camera for which lens distortion is not taken into account have the issue of straight lines being measured as curved lines. Such a phenomenon causes a decrease in the accuracy of image processing such as self-position estimation and object recognition performed by the camera. In particular, when shooting a large area using a wide-angle lens, the peripheral portion of the image is largely distorted. When distortion is large, an object cannot be accurately recognized even when the object is visible in the image, and it is difficult to utilize the properties of a wide-angle lens. In order to perform accurate image processing, an image needs to be corrected such that lens distortion is removed and straight lines are measured as straight lines.

As one method of estimating lens distortion, a method is known in which, for each pixel of a camera element, positions of pixels that have been corrected for distortion are non-parametrically estimated by measuring various straight lines a plurality of times (see Non-Patent Document 1, for example). Specifically, Non-Patent Document 1 discloses a method for shooting various gray code patterns displayed on a flat display, and using the shot gray code patterns to correct distortion based on the principle of so-called structured light.

However, such a non-parametrical method requires that an environment be prepared in advance and is based on the premise that distortion during shooting is constant. Thus, such a non-parametrical method has the issue of not being applicable in cases where distortion adaptively changes such as when a zoom lens is used.

On the other hand, as a method of adaptively estimating lens distortion, a parametrical method is disclosed in which mathematical equations are used to model distortion (see Non-Patent Documents 2 to 5, for example). Specifically, Non-Patent Document 2 discloses a method for estimating lens distortion by using the notion of "when lens distortion is only assumed as being radial distortion, straight lines are measured as second order curved lines" and fitting the second order curved lines to edges in the image. The assumption of correcting only radial distortion while assuming tangential distortion and thin prism distortion to be zero is sufficiently established in modern digital cameras.

Also, Non-Patent Document 3 discloses a method for simultaneously estimating first-order approximated radial lens distortion, a basic matrix, and a homography matrix by using corresponding points in two images of the same subject shot from two different positions. Furthermore, Non-Patent Documents 4 and 5 disclose methods for simultaneously estimating third-order approximated radial lens distortion and a perspective projection matrix in order to deal with distortion of a wider angle.

Incidentally, in order to support a range of lenses from lenses with little distortion to wide-angle lenses, a radial lens distortion model represented by a single unknown and with which the unknown can be analytically calculated is required.

However, with the methods disclosed in Non-Patent Documents 2, 3, 4, and 5, a model that approximates radial distortion using a polynomial expression is used, but if polynomial approximation is used, the approximation order needs to be increased to deal with large distortion, that is, to support a wide-angle lens. The appropriate approximation order cannot be known in advance, and thus, with these methods, approximation of a low order leaves distortion while approximation of a high order leads to unstable numerical calculation due to over fitting. That is to say, with these methods, it is difficult to support a range of lenses from lenses with little distortion to wide-angle lenses.

Also, image coordinates need to be inversely transformed in order to remove distortion, but with polynomial approximation, it is difficult to derive an analytical inverse transformation. Accordingly, the methods disclosed in Non-Patent Documents 2, 3, 4, and 5 also have the issue of incurring a large calculation amount for obtaining numerical results through non-linear optimization.

Also, the method disclosed in Non-Patent Document 3 describes that a basic matrix and a homography matrix can be calculated as a generalized eigenvalue problem, provided that a first-order polynomial approximation expressed by a single variable is used. However, in the method disclosed in Non-Patent Document 3, if approximation of a higher order is used, the unknown increases, and thus solving a basic matrix and a homography matrix calculation as a generalized eigenvalue problem becomes difficult.

Furthermore, the methods disclosed in Non-Patent Documents 4 and 5 support wide-angle lenses by using a high-order polynomial approximation expressed by three variables. However, the methods disclosed in Non-Patent Documents 4 and 5 have the issue of deriving a perspective projection matrix based on ad-hoc variable elimination, and cannot be applied to the derivation of other geometric matrices of a camera such as a basic matrix and a homography matrix.

On the other hand, Non-Patent Document 6 discloses a method of using a Field-of-View model (hereinafter referred to as "FOV model") as a model for expressing radial distortion. An FOV model has the benefit of the number of unknowns being one and inverse transformations being analytically derivable. Thus, according to the method disclosed in Non-Patent Document 6, it is conceivable to be able to support a range of lenses from lenses with little distortion to wide-angle lenses.

LIST OF RELATED ART DOCUMENTS

Non-Patent Documents

Non-Patent Document 1: Sagawa et al., "Calibration of lens distortion by structured-light scanning," pp. 832-837, IROS 2005, IEEE.

Non-Patent Document 2: Bukhari et al., "Automatic radial distortion estimation from a single image," Journal of Mathematical Imaging and Vision, vol. 45, no. 1, pp. 31-45, 2013, Springer.

Non-Patent Document 3: Fitzgibbon, "Simultaneous linear estimation of multiple view geometry and lens distortion," CVPR 2011, IEEE.

Non-Patent Document 4: Kukelova et al., "Real-time solution to the absolute pose problem with unknown radial distortion and focal length," ICCV 2013, IEEE.

Non-Patent Document 5: Nakano, "A versatile approach for solving PnP, PnPf, and PnPfr problems," ECCV 2016.

Non-Patent Document 6: Devernay and Faugeras, "Straight lines have to be straight," Machine Vision and Applications, vol. 13, no. 1, pp. 14-24, 2001, Springer.

SUMMARY OF INVENTION

Problems to be Solved by the Invention

However, in an FOV model, the unknown is an argument of a trigonometric function, and thus the unknown cannot be directly calculated and the calculation of the unknown needs to be performed numerically through non-linear optimization.

An example object of the invention is to provide a camera parameter estimation apparatus, a camera parameter estimation method, and a computer-readable recording medium that solve the above problems, such that it is possible to estimate a lens distortion parameter and a geometric parameter of a camera by using a model that can express radial distortion of a lens with a single unknown.

Means for Solving the Problems

In order to achieve the example object described above, a camera parameter estimation apparatus according to an example aspect of the invention is an apparatus for estimating a geometric parameter of a camera that has shot an image of an object and a lens distortion parameter of a lens distortion model represented by a single unknown, the apparatus including:

a data obtaining unit configured to obtain image corresponding points relating to the object and an approximation order for polynomial approximation of the lens distortion model; and a parameter estimation unit configured to estimate the geometric parameter and the lens distortion parameter based on the image corresponding points and the approximation order.

In order to achieve the example object described above, a camera parameter estimation method according to an example aspect of the invention is a method for estimating a geometric parameter of a camera that has shot an image of an object and a lens distortion parameter of a lens distortion model represented by a single unknown, the method including:

(a) a step of obtaining image corresponding points relating to the object and an approximation order for polynomial approximation of the lens distortion model; and (b) a step of estimating the geometric parameter and the lens distortion parameter based on the image corresponding points and the approximation order.

Furthermore, in order to achieve the example object described above, a computer-readable recording medium according to an example aspect of the invention includes a program recorded thereon for, with a computer, estimating a geometric parameter of a camera that has shot an image of an object and a lens distortion parameter of a lens distortion model represented by a single unknown, the program including instructions that cause the computer to carry out the steps of:

(a) obtaining image corresponding points relating to the object and an approximation order for polynomial approximation of the lens distortion model; and (b) estimating the geometric parameter and the lens distortion parameter based on the image corresponding points and the approximation order.

Advantageous Effects of the Invention

As described above, according to the invention, it is possible to estimate lens distortion parameters and geometric parameters of a camera by using a model that can express radial distortion of a lens with a single unknown.

EXAMPLE EMBODIMENT

Example Embodiment

Following is a description of a camera parameter estimation apparatus, a camera parameter estimation method, and a program according to an example embodiment of the invention, with reference to FIGS. 1 to 4.

[Apparatus Configuration]

Figure 1:
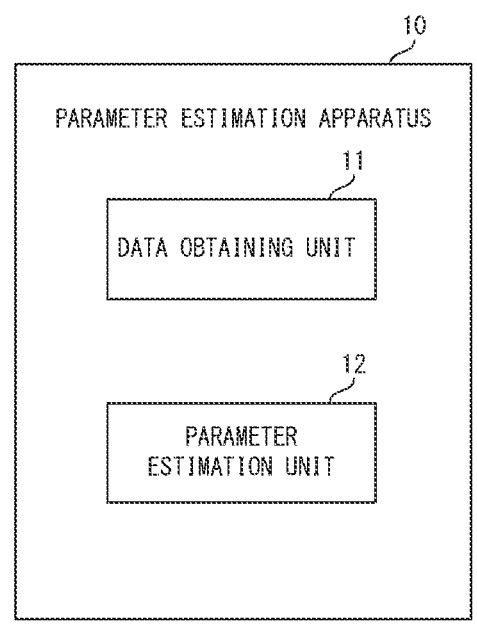
FIG. 1 is a block diagram showing a configuration of a camera parameter estimation apparatus according to an example embodiment of the invention.

First, the configuration of a camera parameter estimation apparatus according to the example embodiment will be described with reference to FIG. 1. FIG. 1 is a block diagram showing a configuration of the camera parameter estimation apparatus according to the example embodiment of the invention.

A camera parameter estimation apparatus 10 according to this example embodiment shown in FIG. 1 estimates a geometric parameter of a camera that has shot an image of an object and a lens distortion parameter of a lens distortion model expressed by a single unknown. As shown in FIG. 1, the camera parameter estimation apparatus 10 is provided with a data obtaining unit 11 and a parameter estimation unit 12.

The data obtaining unit 11 obtains image corresponding points of an object and an approximation order for polynomial approximation of a lens distortion model expressed by a single unknown. The parameter estimation unit 12 estimates a geometric parameter and a lens distortion parameter based on the image corresponding points and the approximation order obtained by the data obtaining unit 11.

Here, "geometric parameter" refers to a parameter defining transformation of image corresponding points. Specific examples of a geometric parameter include a homography matrix that represents planar transformation between two images, a basic matrix that represents a relative projection relation of a camera between two images, and a projection transformation matrix that represents transformation between 3D points and corresponding 2D points projected onto one image.

The input image corresponding points differ according to the geometric parameter to be estimated. For example, if the geometric parameter is a homography matrix or a basic matrix, the image corresponding points are corresponding 2D points on images. Also, if the geometric parameter is a projection transformation matrix, the image corresponding points are 3D points and 2D points obtained by projecting these 3D points.

The number of corresponding points required for estimation differs according to the degree of freedom of the geometric parameter. Note that this is a widely known fact and thus details thereof are omitted. Also, these corresponding points are not those of a degenerate configuration also known as a critical configuration. The reason being that a geometric parameter cannot be logically estimated for such corresponding points.

Thus, in this example embodiment, a geometric parameter and a lens distortion parameter are estimated based on the image corresponding points and an approximation order for polynomial approximation of a lens distortion model. With this example embodiment, it is possible to estimate a lens distortion parameter and a geometric parameter of a camera by using a model that can express radial distortion of a lens with a single unknown.

Also, in this example embodiment, the parameter estimation unit 12 can estimate a plurality of geometric parameter candidates and a plurality of lens distortion parameter candidates based on the image corresponding points and the approximation order. In this case, the parameter estimation unit 12 selects, from the candidates, the geometric parameter candidate and the lens distortion parameter candidate that minimize an error function, and outputs the selected candidates as the geometric parameter and the lens distortion parameter. Also, the error function is a function that represents the transformation relation between the image corresponding points and the geometric parameter and lens distortion parameter.

Furthermore, in this example embodiment, if the number of image corresponding points does not meet a set condition (for example, the number of image corresponding points is excessively high), the parameter estimation unit 12 selects the geometric parameter candidate and the lens distortion parameter candidate that minimize the error function through non-linear optimization.

[Apparatus Operations]

Figure 2:
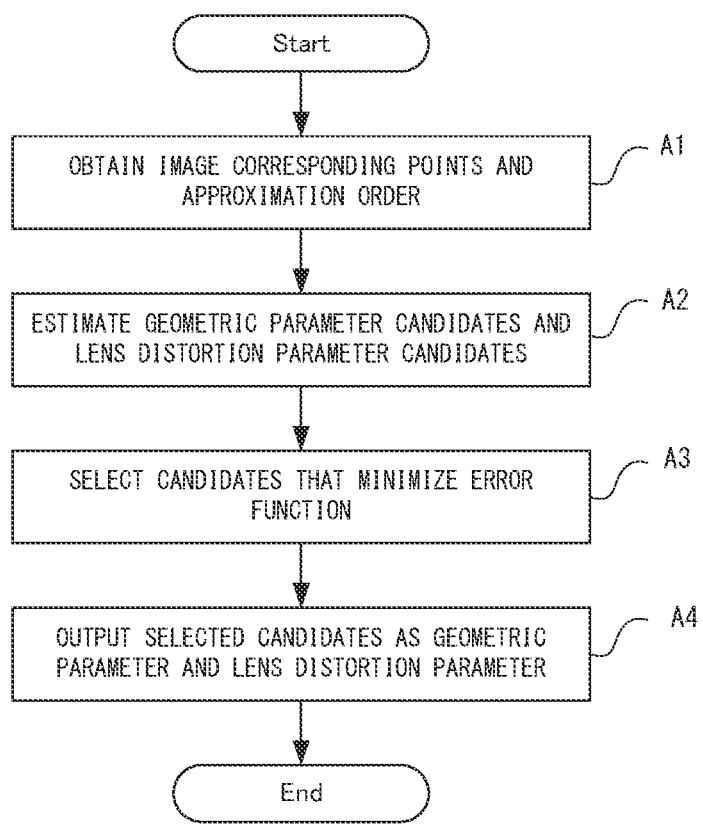
FIG. 2 is a flowchart showing operations of the camera parameter estimation apparatus according to an example embodiment of the invention.

Next, operations of the camera parameter estimation apparatus 10 according to this example embodiment will be described with reference to FIG. 2. FIG. 2 is a flowchart showing operation of the camera parameter estimation apparatus according to this example embodiment of the invention. The following description refers to FIG. 1 as appropriate. Also, in the first example embodiment, a camera parameter estimation method is implemented by operating the camera parameter estimation apparatus 10. Thus, the description of the camera parameter estimation method in this example embodiment is be replaced with the description of operation of the camera parameter estimation apparatus below.

As shown in FIG. 2, the data obtaining unit 11 obtains image corresponding points of an object and an approximation order for polynomial approximation of a lens distortion model expressed by a single unknown (step A1).

Next, the parameter estimation unit 12 estimates geometric parameter candidates and lens distortion parameter candidates based on the image corresponding points and the approximation order obtained in step A1 (step A2).

Next, the parameter estimation unit 12 selects, from the candidates estimated in step A2, the geometric parameter candidate and the lens distortion parameter that minimize the error function (step A3).

Then, the parameter estimation unit 12 outputs the candidates selected in step A3 as the geometric parameter and the lens distortion parameter (step A4).

SPECIFIC EXAMPLES

Next, specific examples of this example embodiment will be described. Note that in the specific examples below, the distortion center is assumed as being the image center (that is, half of the size of an image). This assumption is also employed in above-described Non-Patent Documents 2 to 5, and is a valid assumption as recent digital cameras are manufactured to high levels of precision. Note that a known value calculated in advance may be used as the distortion Center, and May be Freely Changed by a Person Skilled in the Art According to the Situation in which it is to be used.

(1) Lens Distortion Model

First the lens distortion model will be described. Also, in the following description, the superscript T represents a transposition of a matrix and a vector. Also, w represents the distortion coefficient, $m_u$ represents the undistorted image coordinates, and $m_d$ represents distorted image coordinates. Furthermore, the undistorted image coordinates $m_u$ can be represented by the following Equation 1, and the distorted image coordinates $m_d$ can be represented by the following Equation 2.

$$m_u = [x_u, y_u]^T \qquad \text{[Equation 1]}$$

$$m_d = [x_d, y_d]^T \qquad \text{[Equation 2]}$$

Also, $\tilde{m}_u$ and $\tilde{m}_d$ represent the homogenized coordinates of image coordinates. Furthermore, $\tilde{m}_u$ can be represented by the following Equation 3, and the $\tilde{m}_d$ can be represented by the following Equation 4.

$$\tilde{m}_u = [x_u, y_u, 1]^T \qquad \text{[Equation 3]}$$

$$\tilde{m}_u = [x_d, y_d, 1]^T \qquad \text{[Equation 4]}$$

The distortion model is defined here. When the lens distortion is assumed to be radial distortion only, the transformation relation between $m_u$ and $m_d$ is represented by Equation 5 below.

$$m_d = \frac{r_d}{r_u} m_u \qquad \text{[Equation 5]}$$

Also, the following Equations 6 and 7 hold true, and thus by following Non-Patent Document 5 mentioned above, the transformation relation between $r_u$ and $r_d$ based on the FOV model can be represented by Equations 8 and 9.

$$r_u = \sqrt{x_u^2 + y_u^2} \qquad \text{[Equation 6]}$$

$$r_d = \sqrt{x_d^2 + y_d^2} \qquad \text{[Equation 7]}$$

$$r_d = \frac{1}{w}\arctan\left(2r_u \tan\frac{w}{2}\right) \quad \text{[Equation 8]}$$

$$r_u = \frac{\tan(r_d w)}{2\tan\frac{w}{2}} \quad \text{[Equation 9]}$$

In the Equations 5, 8, and 9, the undistorted values, that is, $x_u$, $y_u$, and $r_u$ are generally unknown, and can be estimated from measurable distorted values $x_d$, $y_d$, and $r_d$. It is known that, if the distortion coefficient w is obtained from the Equations 5, 8, and 9, $r_u$ can be calculated from $r_d$, and $m_u$ can be directly calculated from $m_d$.

When the above Equation 5 is modified and the modified Equation 5 is expressed using homogenized coordinates, Equation 10 below is realized.

$$\frac{r_u}{r_d}m_d = m_u \iff \begin{bmatrix} x_d \\ y_d \\ z_d \end{bmatrix} \propto \begin{bmatrix} x_u \\ y_u \\ 1 \end{bmatrix} \quad \text{[Equation 10]}$$

In Equation 10, $z_d = r_d/r_u$ holds true, and the symbol $\propto$ indicates that the left side and the right side are unvarying to each other to a constant factor. Using the fact that the distortion coefficient w is close to zero (0), when $z_d$ undergoes Taylor expansion, $z_d$ is represented by the following Equations 11 to 13. It should be noted that, in Equation 11, $a_{2n}$ is an approximation coefficient corresponding to $w^{2n}$.

$$x_d = \frac{r_u}{r_d} \quad \text{[Equation 11]}$$
$$= \frac{2r_d \tan\frac{w}{2}}{\tan(r_d w)}$$
$$\sim 1 + a_2 w^2 + a_4 w^4 + \ldots + a_{2n} w^{2n}$$

$$a_2 = \frac{1 - 4r_d^2}{12} \quad \text{[Equation 12]}$$

$$a_4 = \frac{3 - 8r_d^4 - 10r_d^2}{360} \quad \text{[Equation 13]}$$

When the Equations 11 to 13 are used, Equation 10 is expressed by Equations 14 and 15.

$$\begin{bmatrix} x_d \\ y_d \\ 1 \end{bmatrix} + \begin{bmatrix} 0 \\ 0 \\ a_2 \end{bmatrix} w^2 + \begin{bmatrix} 0 \\ 0 \\ a_4 \end{bmatrix} w^4 + \quad \text{[Equation 14]}$$
$$\ldots \propto \begin{bmatrix} x_u \\ y_u \\ 1 \end{bmatrix} \iff \tilde{m}_d + \sum_{i=1}^{u} w^{2i} p_{2i} \propto \tilde{m}_u$$

$$p_{2i} = \begin{bmatrix} 0 \\ 0 \\ a_{2i} \end{bmatrix} \quad \text{[Equation 15]}$$

The polynomial approximations of the FOV models represented by the Equations 11 to 13, 14, and 15 are lens distortion models according to this specific example.

(2) Calculation of Distortion Coefficient and Camera Parameter

Next, the method for calculating the distortion coefficient w and camera parameters (geometric parameter and lens distortion parameter) will be described. In this specific example, for convenience, a method for simultaneously estimating the distortion coefficient w and the basic matrix will be described assuming that n=2. When n=2, the distortion model is represented by Equation 16 below. Note that n is a variable shown in Equation 11.

$$\tilde{m}_u \propto \tilde{m}_d + w^2 p_2 + w^4 p_4 \quad \text{[Equation 16]}$$

The epipolar equation that is satisfied by the basic matrix F is expressed by Equation 17 below.

$$\tilde{m}'_u{}^T F \tilde{m}_u = 0 \quad \text{[Equation 17]}$$

$\tilde{m}'_u$ represents the homogenized coordinates of the corresponding points on two images, relative to the $\tilde{m}_u$. When Equation 16 is substituted into Equation 17, an epipolar equation including the distortion coefficient w is expressed by Equation 18 below.

$$(\tilde{m}'_d + w^2 p'_2 + w^4 p'_4)^T F (\tilde{m}_d + w^2 p_2 + w^4 p_4) = \tilde{m}'_d{}^T F \tilde{m}_d + w^2$$
$$(\tilde{m}'_d{}^T F p_2 + p'_2{}^T F \tilde{m}_d) +$$

$$w^4 (\tilde{m}'_d{}^T F p_4 + p'_2{}^T F p_2 + p'_4{}^T F \tilde{m}_d) + w^6 (p'_2{}^T F p_4 + p'_4{}^T F p_2) +$$

$$w^8 p'_4{}^T F p_4 \quad \text{[Equation 18]}$$

Then, when nine corresponding points are provided and Equation 18 is expressed by a matrix, Equation 19 is realized as the following.

$$(D_1 + \lambda D_2 + \lambda^2 D_3 + \lambda^3 D_4 + \lambda^4 D_5) f = 0 \quad \text{[Equation 19]}$$

Here, $\lambda = w^2$ holds true and f indicates the vectorized F. Also, D is a coefficient matrix for each $\lambda$.

The Equation 19 is a 9×9 matrix polynomial problem in which f is an eigenvector and $\lambda$ is an eigenvalue, and can be solved by using a library of iterative solvers for linear systems. Also, $\lambda = w^2$ holds true, and thus it is sufficient to extract eigenvectors that correspond only to positive eigenvalues. Also, the distortion coefficient w can be calculated as $w = \lambda^{\wedge}(1/2)$.

Also, when more than nine corresponding points are provided, it is sufficient to multiply the transposition of $D_1$ in Equation 19 from the left, and similarly solve Equation 19 as a 9×9 matrix polynomial.

When solving Equation 19, nine eigenvalues and their corresponding eigenvectors can be obtained. If the number of corresponding points exceeds nine, it is sufficient to select a set of eigenvalues and eigenvectors with which an algebraic error or a re-projection error based on Equation 17 is minimized.

When the number of corresponding points is nine, the algebraic error and the re-projection error are also zero, but a suitable $\lambda$ may be empirically selected. That is, when $\lambda = w^2$ holds true, $\lambda$ may be set to the smallest positive real number larger than zero using the fact that Equation 15 is a Taylor expansion of an FOV model around w=0. Also, if the range of λ is known in advance, λ may be selected through threshold processing based on the known range.

Equation 19 is an approximation of the FOV model, and thus an algebraic error or a re-projection error based on Equation 17 may be minimized through non-linear optimization such as a Newton method by setting the obtained distortion coefficient w as an initial value, and employing a real FOV model that is based on Equations 8 and 9. Also, a polynomial approximation with an increased approximation order may be used instead of a real FOV model.

In this specific example, n=2, but a larger n may be used in order to increase the approximation accuracy, and in this case as well, the problem is reduced to a similar matrix polynomial problem. On the other hand, when it is known in advance that there is little distortion, n may be set to 1 when it is desired to keep the computation amount low. In that case, the order of λ in the matrix polynomial is small, and thus can be solved with a reduced calculation amount. If the obtained solution is inaccurate, the above-described non-linear optimization may be performed.

Effects According to Example Embodiment

As described above, according to the present example embodiment, in either case where the lens distortion is small or large, the lens distortion parameter can be expressed by a single unknown and estimated simultaneously with the geometric parameter of the camera. The reason for this is as follows.

The FOV model is a method of formulating lens distortion of an extremely wide-angle fish eye lens. Equations 11 to 13 are polynomial approximations of the FOV model, but the distortion coefficient w takes a value close to 0 even in a wide-angle lens. Accordingly, polynomial approximation is valid even when distortion is large, and thus the lens distortion parameter can be estimated by increasing the approximation order unlike the conventional method in which the unknown of the lens distortion parameter is increased. Conversely, if there is little distortion, it is sufficient to reduce the approximation order n. Thus, according to this example embodiment, the magnitude of distortion can be addressed by increasing or decreasing the approximation order without changing the number of parameters, and thus issues with the conventional method can be resolved.

[Variations]

The invention is not limited to only the example embodiments described above. In the invention, various modifications that will be appreciated by those skilled in the art can be made to the example embodiments described above. For example, the invention can also be carried out through modes disclosed in the following variations.

(1) First Variation

In the above-described embodiment, the geometric parameter of the camera is not limited to a basic matrix. For example, other geometric parameters of the camera including a homography matrix and a perspective projection matrix can be calculated using a similar method. As disclosed in the above Non-Patent Document 3, the problem is similarly reduced to a matrix polynomial in either case.

(2) Second Variation

Figure 3:
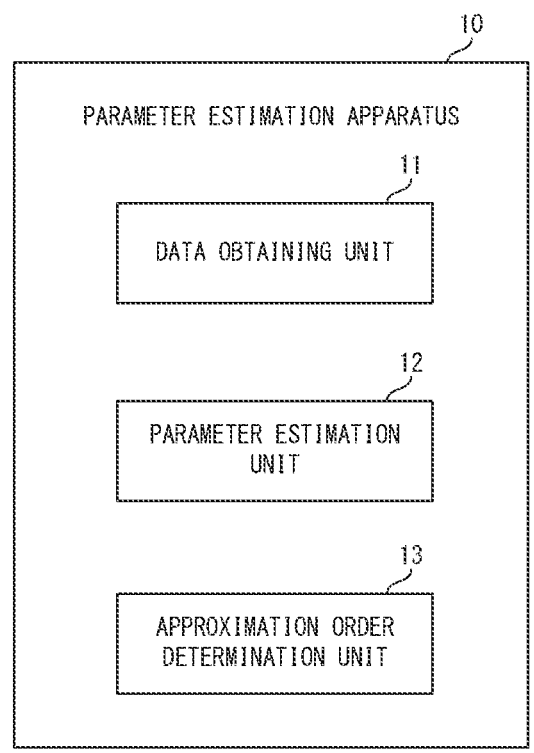
FIG. 3 is a block diagram showing another example configuration of the camera parameter estimation apparatus according to an example embodiment of the invention.

In this example embodiment, as shown in FIG. 3, the camera parameter estimation apparatus 10 may be provided with an approximation order determination unit 13 that calculates an approximation order from the focal length of a camera at the time of shooting and the resolution of the shot image. The approximation order determination unit 13 can obtain the image resolution and an approximate focal length at the time of shooting by using, for example, tag information and Exif information embedded in the image. FIG. 3 is a block diagram showing another example of the configuration of the camera parameter estimation apparatus according to the example embodiment of the invention. In the second variation, the data obtaining unit 11 only obtains the image corresponding points.

Also, the approximation order determination unit 13 can calculate an angle of view based on a ratio between the width or height of an image and the focal distance of the camera at the time of shooting, and use an approximate lens distortion value that corresponds to the magnitude of the angle of view as prior information to determine the approximation order of the lens distortion model.

(3) Third Variation

In the above-described example embodiment, the method for calculating the geometric parameter of the camera and the lens distortion parameter is not limited to a matrix polynomial. For example, Non-Patent Documents 4 and 5 above disclose a method for calculating a perspective projection matrix when there is one lens distortion parameter, and the methods disclosed in the Non-Patent Documents 4 and 5 may be used in place of the matrix polynomial in this example embodiment as well.

[Program]

A program according to this example embodiment may be a program that causes a computer to execute steps A1 to A4 shown in FIG. 2. By installing this program in the computer and executing the program, the camera parameter estimation apparatus 10 and the camera parameter estimation method according to this example embodiment can be realized. In this case, a processor of the computer performs processing while functioning as the data obtaining unit 11, the parameter estimation unit 12, and also as the approximation order determination unit 13.

Also, the program according to this example embodiment may be executed by a computer system constructed using a plurality of computers. In this case, for example, each computer may respectively function as any of the data obtaining unit 11, the parameter estimation unit 12, and the approximation order determination unit 13.

Figure 4:
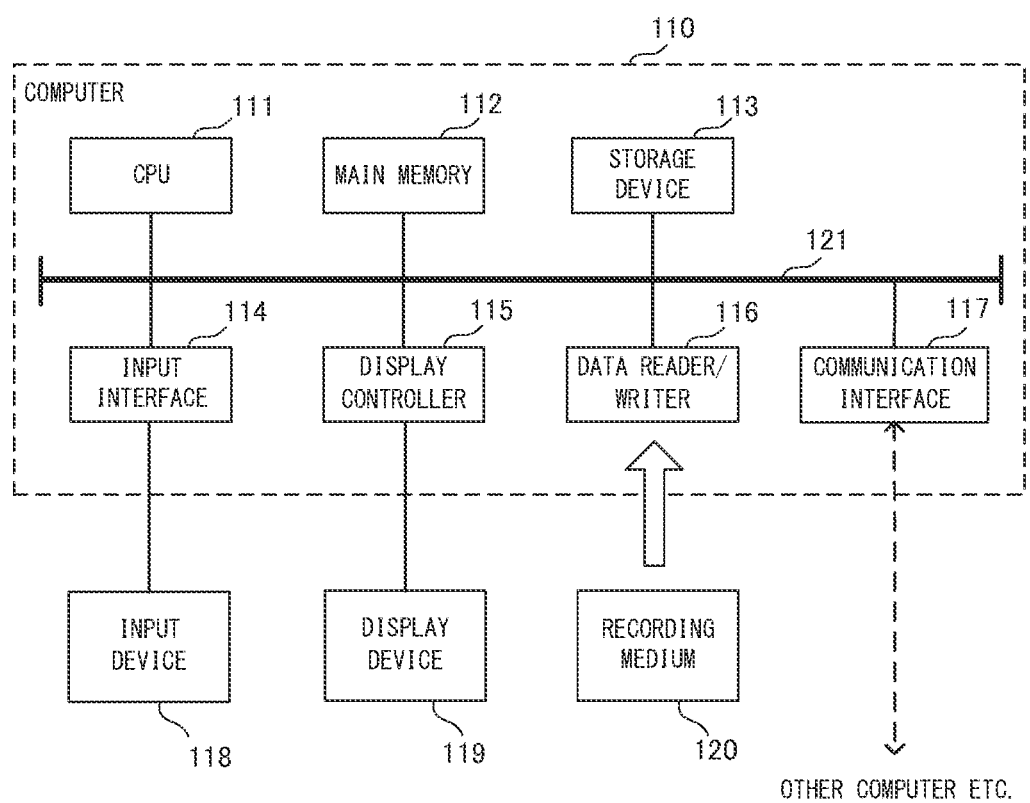
FIG. 4 is a block diagram showing an example of a computer that realizes the camera parameter estimation apparatus according to an example embodiment of the invention.

Here, a computer that realizes the camera parameter estimation apparatus 10 by executing the program according to this example embodiment will be described with reference to FIG. 4. FIG. 4 is a block diagram showing an example of a computer that realizes the camera parameter estimation apparatus according to the example embodiment of the invention.

As shown in FIG. 4, the computer 110 includes a CPU (Central Processing Unit) 111, a main memory 112, a storage apparatus 113, an input interface 114, a display controller 115, a data reader/writer 116, and a communication interface 117. These units are each connected so as to be capable of performing data communication with each other through a bus 121. Also, the computer 110 may also include a GPU (Graphics Processing Unit) or an FPGA (Field-Programmable Gate Array) in addition to the CPU 111 or instead of the CPU 111.

The CPU 111 expands program (codes) according to this example embodiment, which was stored in the storage apparatus 113, in the main memory 112 and performs various operations by executing each code in a predetermined order. The main memory 112 is typically a volatile storage apparatus such as a DRAM (Dynamic Random Access Memory). Also, the program according to this example embodiment is provided in a state of being stored in a computer-readable recording medium 120. Note that the program according to this example embodiment may be distributed on the Internet, which is connected through the communication interface 117.

Also, other than a hard disk drive, a semiconductor storage apparatus such as a flash memory is be given as a specific example of the storage apparatus 113. The input interface 114 mediates data transmission between the CPU 111 and an input device 118, which may be a keyboard or mouse. The display controller 115 is connected to a display device 119, and controls display by the display device 119.

The data reader/writer 116 mediates data transmission between the CPU 111 and the recording medium 120, and executes reading out of the program from the recording medium 120 and writing of processing results in the computer 110 to the recording medium 120. The communication interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) are given as specific examples of the recording medium 120.

Note that the camera parameter estimation apparatus 10 according to this example embodiment can be realized not only by a computer with the program installed, but also by using hardware corresponding to each part. Further, a configuration may be adopted in which a portion of the camera parameter estimation apparatus 10 is realized by a program, and the remaining portions are realized by hardware.

A portion or all of the example embodiments described above can be realized according to (supplementary note 1) to (supplementary note 12) described below, but the following description does not limit the invention.

(Supplementary Note 1)

A camera parameter estimation apparatus for estimating a geometric parameter of a camera that has shot an image of an object and a lens distortion parameter of a lens distortion model represented by a single unknown, the apparatus including:
  a data obtaining unit configured to obtain image corresponding points relating to the object and an approximation order for polynomial approximation of the lens distortion model; and
  a parameter estimation unit configured to estimate the geometric parameter and the lens distortion parameter based on the image corresponding points and the approximation order.

(Supplementary Note 2)

The camera parameter estimation apparatus according to Supplementary Note 1,
  wherein the parameter estimation unit estimates a plurality of candidates for the geometric parameter and a plurality of candidates for the lens distortion parameter based on the image corresponding points and the approximation order, and
  selects the geometric parameter candidate and the lens distortion parameter candidate that minimize an error function that represents a transformation relation between the image corresponding points and the geometric parameter and lens distortion parameter from the candidates.

(Supplementary Note 3)

The camera parameter estimation apparatus according to Supplementary Note 2,
  wherein, if the number of the image corresponding points does not meet a set condition, the parameter estimation unit selects the geometric parameter candidate and the lens distortion parameter candidate that minimize the error function through non-linear optimization.

(Supplementary Note 4)

The camera parameter estimation apparatus according to any one of Supplementary Notes 1 to 3, further including:
  an approximation order determination unit configured to determine the approximation order of the lens distortion model based on a focal length of the camera at the time of shooting and a resolution of the shot image.

(Supplementary Note 5)

A camera parameter estimation method for estimating a geometric parameter of a camera that has shot an image of an object and a lens distortion parameter of a lens distortion model represented by a single unknown, the method including:
  (a) a step of obtaining image corresponding points relating to the object and an approximation order for polynomial approximation of the lens distortion model; and
  (b) a step of estimating the geometric parameter and the lens distortion parameter based on the image corresponding points and the approximation order.

(Supplementary Note 6)

The camera parameter estimation method according to Supplementary Note 5, wherein, in the (b) step, a plurality of candidates for the geometric parameter and a plurality of candidates for the lens distortion parameter are estimated based on the image corresponding points and the approximation order, and
  the geometric parameter candidate and the lens distortion parameter candidate that minimize an error function that represents a transformation relation between the image corresponding points and the geometric parameter and lens distortion parameter are selected from the candidates.

(Supplementary Note 7)

The camera parameter estimation method according to Supplementary Note 6, wherein, in the (b) step, if the number of the image corresponding points does not meet a set condition, the geometric parameter candidate and the lens distortion parameter candidate that minimize the error function through non-linear optimization are selected.

(Supplementary Note 8)

The camera parameter estimation method according to any one of Supplementary Notes 5 to 7,
  further including a step (c) of determining an approximation order of the lens distortion model based on a focal length of the camera at the time of shooting and a resolution of the shot image.

(Supplementary Note 9)

A computer-readable recording medium that includes a program recorded thereon for, with a computer, estimating a geometric parameter of a camera that has shot an image of an object and a lens distortion parameter of a lens distortion model represented by a single unknown, the program including instructions that cause the computer to carry out the steps of:
  (a) obtaining image corresponding points relating to the object and an approximation order for polynomial approximation of the lens distortion model; and
  (b) estimating the geometric parameter and the lens distortion parameter based on the image corresponding points and the approximation order.

(Supplementary Note 10)

The computer-readable recording medium according to Supplementary Note 9, wherein, in the (b) step, a plurality of candidates for the geometric parameter and a plurality of candidates for the lens distortion parameter are estimated based on the image corresponding points and the approximation order, and the geometric parameter candidate and the lens distortion parameter candidate that minimize an error function that represents a transformation relation between the image corresponding points and the geometric parameter and lens distortion parameter are selected from the candidates.

(Supplementary Note 11)

The computer-readable recording medium according to Supplementary Note 10, wherein, in the (b) step, if the number of the image corresponding points does not meet a set condition, the geometric parameter candidate and the lens distortion parameter candidate that minimize the error function through non-linear optimization are selected.

(Supplementary Note 12)

The computer-readable recording medium according to any one of Supplementary Notes 9 to 11, the program further including an instruction that causes the computer to carry out the step of:

(c) determining an approximation order of the lens distortion model based on a focal length of the camera at the time of shooting and a resolution of the shot image.

Although the invention is described above with reference to example embodiments, the invention is not limited by the above example embodiments. Various modifications that will be appreciated by those skilled in the art can be made to the configurations or details of the invention within the scope of the invention.

INDUSTRIAL APPLICABILITY

As described above, according to the invention, it is possible to estimate lens distortion parameters and geometric parameters of a camera by using a model that can express radial distortion of a lens with a single unknown. The invention is effective in various image processing systems in which lens distortion needs to be corrected.

DESCRIPTION OF REFERENCE SIGNS

10 Camera parameter estimation apparatus
11 Data obtaining unit
12 Parameter estimation unit
13 Approximation order determination unit
110 Computer
111 CPU
112 Main memory
113 Storage apparatus
114 Input interface
115 Display controller
116 Data reader/writer
117 Communication interface
118 Input device
119 Display device
120 Recording medium
121 Bus

What is claimed is:

1. A camera parameter estimation apparatus for estimating a geometric parameter of a camera that has shot an image of an object and a lens distortion parameter of a lens distortion model represented by a single unknown, the apparatus comprising:

a processor; and
a memory storing instructions executable by the processor to:
obtain image corresponding points relating to the object and an approximation order for polynomial approximation of the lens distortion model;
estimate the geometric parameter and the lens distortion parameter based on the image corresponding points and the approximation order, by:
estimating a plurality of candidates for the geometric parameter and a plurality of candidates for the lens distortion parameter based on the image corresponding points and the approximation order; and
selecting the geometric parameter candidate and the lens distortion parameter candidate that minimize an error function that represents a transformation relation between the image corresponding points and the geometric parameter and the lens distortion parameter,
wherein when a number of the image corresponding points does not meet a set condition, the geometric parameter candidate and the lens distortion parameter candidate that minimize the error function through non-linear optimization are selected.

2. The camera parameter estimation apparatus according to claim 1, wherein the instructions are executable by the processor to further:

determine the approximation order of the lens distortion model based on a focal length of the camera at a time of shooting and a resolution of the shot image.

3. A camera parameter estimation method for estimating a geometric parameter of a camera that has shot an image of an object and a lens distortion parameter of a lens distortion model represented by a single unknown, the method comprising:

obtaining, by a processor, image corresponding points relating to the object and an approximation order for polynomial approximation of the lens distortion model;
estimating, by the processor, the geometric parameter and the lens distortion parameter based on the image corresponding points and the approximation order, by:
estimating a plurality of candidates for the geometric parameter and a plurality of candidates for the lens distortion parameter based on the image corresponding points and the approximation order; and
selecting the geometric parameter candidate and the lens distortion parameter candidate that minimize an error function that represents a transformation relation between the image corresponding points and the geometric parameter and the lens distortion parameter,
wherein when a number of the image corresponding points does not meet a set condition, the geometric parameter candidate and the lens distortion parameter candidate that minimize the error function through non-linear optimization are selected.

4. The camera parameter estimation method according to claim 3, further comprising determining an approximation order of the lens distortion model based on a focal length of the camera at the time of shooting and a resolution of the shot image.

5. A non-transitory computer-readable recording medium storing a program that is executable by a processor to perform processing for estimating a geometric parameter of a camera that has shot an image of an object and a lens distortion parameter of a lens distortion model represented by a single unknown, the processing comprising:
- obtaining image corresponding points relating to the object and an approximation order for polynomial approximation of the lens distortion model;
- estimating the geometric parameter and the lens distortion parameter based on the image corresponding points and the approximation order, by:
  - estimating a plurality of candidates for the geometric parameter and a plurality of candidates for the lens distortion parameter based on the image corresponding points and the approximation order; and
  - selecting the geometric parameter candidate and the lens distortion parameter candidate that minimize an error function that represents a transformation relation between the image corresponding points and the geometric parameter and the lens distortion parameter,
- wherein when a number of the image corresponding points does not meet a set condition, the geometric parameter candidate and the lens distortion parameter candidate that minimize the error function through non-linear optimization are selected.

6. The non-transitory computer-readable recording medium according to claim 5, wherein the processing further comprises:
- determining an approximation order of the lens distortion model based on a focal length of the camera at the time of shooting and a resolution of the shot image.

* * * * *